(12) United States Patent
Bawiskar et al.

(10) Patent No.: US 10,894,852 B2
(45) Date of Patent: Jan. 19, 2021

(54) HIGHLY GRAFTED ETHYLENE-BASED POLYMERS, HIGHLY GRAFTED ETHYLENE-BASED POLYMER COMPOSITIONS, AND PROCESSES FOR FORMING THE SAME

(71) Applicant: Dow Global Technologies LLC, Midland, MI (US)

(72) Inventors: Santosh S. Bawiskar, Freeport, TX (US); Brian W. Walther, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 354 days.

(21) Appl. No.: 16/061,618

(22) PCT Filed: Dec. 20, 2016

(86) PCT No.: PCT/US2016/067740
§ 371 (c)(1),
(2) Date: Jun. 12, 2018

(87) PCT Pub. No.: WO2017/116843
PCT Pub. Date: Jul. 6, 2017

(65) Prior Publication Data
US 2020/0299445 A1    Sep. 24, 2020

Related U.S. Application Data

(60) Provisional application No. 62/272,390, filed on Dec. 29, 2015.

(51) Int. Cl.
*C08F 255/08* (2006.01)

(52) U.S. Cl.
CPC ........ *C08F 255/08* (2013.01); *C08F 2500/08* (2013.01)

(58) Field of Classification Search
CPC .. C08F 255/08; C08F 2500/08; C08F 222/06; C08F 255/02
See application file for complete search history.

(56) References Cited

U.S. PATENT DOCUMENTS

| | | |
|---|---|---|
| 4,762,890 A | 8/1988 | Strait et al. |
| 4,927,888 A | 5/1990 | Strait et al. |
| 4,966,810 A | 10/1990 | Strait et al. |
| 5,705,565 A | 1/1998 | Hughes |
| 5,844,045 A | 12/1998 | Kolthammer et al. |
| 5,869,575 A | 2/1999 | Kolthammer et al. |
| 6,228,948 B1 | 5/2001 | Flaris et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,545,091 B1 | 4/2003 | Lee et al. |
| 6,566,446 B1 | 5/2003 | Parikh et al. |
| 8,058,373 B2 | 11/2011 | Stevens et al. |
| 8,101,696 B2 | 1/2012 | Konze et al. |
| 8,372,931 B2 | 2/2013 | Hermel-Davidock et al. |
| 8,829,115 B2 | 9/2014 | Hermel-Davidock et al. |
| 8,981,013 B2 | 3/2015 | Silvis et al. |
| 2007/0208110 A1* | 9/2007 | Sigworth ............ C08L 23/0815 524/13 |
| 2010/0160497 A1 | 6/2010 | Karjala et al. |
| 2012/0129417 A1 | 5/2012 | Taha et al. |
| 2016/0304650 A1 | 10/2016 | Read et al. |

FOREIGN PATENT DOCUMENTS

| | | | |
|---|---|---|---|
| CA | 1339160 C | 7/1997 | |
| CN | 102993535 A * | 3/2013 | ............ B29C 48/04 |
| CN | 105566573 A * | 5/2016 | |
| WO | 2010/042335 A1 | 4/2010 | |

\* cited by examiner

*Primary Examiner* — Mark S Kaucher
(74) *Attorney, Agent, or Firm* — Quarles & Brady LLP

(57) ABSTRACT

A process to form a functionalized ethylene-based polymer composition comprises reacting an ethylene-based polymer composition in at least one extruder with at least one functionalization agent and at least one free radical initiator at a melt temperature of greater than or equal to 200° C. The functionalized ethylene-based polymer composition has a yellowness index (YI) value of less than or equal to 45 and a functionalization content of greater than or equal to 2.0 wt %, based on the weight of the functionalized ethylene-based polymer composition.

8 Claims, No Drawings

HIGHLY GRAFTED ETHYLENE-BASED POLYMERS, HIGHLY GRAFTED ETHYLENE-BASED POLYMER COMPOSITIONS, AND PROCESSES FOR FORMING THE SAME

REFERENCE TO RELATED APPLICATIONS

The present application claims the benefit of U.S. Provisional Application 62/272,390, filed Dec. 29, 2015.

BACKGROUND

Highly grafted (e.g., greater than or equal to 2.0 wt % grafted functionality) ethylene-based polymers, particularly ethylene-based copolymers grafted with maleic anhydride (MAH), are useful in adhesive formulations, tie layers for multilayer structures, coupling agents for highly filled or halogen-free flame retardant (HFFR) formulations and compatibilizers in polymer blends. The grafted (e.g., MAH) functionality helps chemical interaction of the ethylene-based polymers to polar polymers like nylon, ethylene vinyl alcohol (EVOH), and inorganic fillers. The grafted functionality also increases the surface polarity of the ethylene-based polymers to improve, for example, adhesion to paints, and printing inks.

For example, MAH-grafted ethylene-based polymers are known to enhance properties such as peel strength in multilayer films, impact strength in blends of polyamides and polyesters with elastomers, mechanical properties (strength/elongation, scratch resistance, etc.), flame retardant properties in filled systems, and also flow behavior. Further, and specifically with respect to MAH grafting, a high MAH content (e.g., greater than or equal to 2.0 wt %) is desirable because (1) it enhances the chemical interaction due to a higher level of functional groups or (2) it allows reduction in the level of MAH-grafted ethylene-based polymers required to achieve the same properties compared to MAH-grafted ethylene-based polymers with low amounts of grafted MAH.

Unfortunately, highly grafted ethylene-based polymers tend to have poor gel and color quality and poor rheology. Further, the methods used to make highly grafted ethylene-based polymers tend to have inherent process inefficiencies resulting in low production rates. As a result, ethylene-based polymers with high (e.g., greater than or equal to 2.0 wt %) graft content are undesirable to use and manufacture. For example, maleated HDPE with greater than 2.0 wt % MAH produced by reactive extrusion, using melting temperatures of greater than 300° C. and no free radical initiators (thermal grafting), is known. However, these MAH-g-HDPEs have high gel contents and high yellowness indices and are produced at low production rates. It is also possible to graft HDPEs to above 2.0 wt % MAH using free radical initiators such as peroxides (see, for example, U.S. Publication No. 2007/0208110(A1)), but the gel levels and/or yellowness indices are/is high. Low gel levels are of particular interest in film applications where such materials are used as tie-layers. The gels appear as visual defects in the film and are unacceptable. Maleated waxes with greater than 2 wt % MAH and maleated polyethylenes (PEs) with up to 2 wt % MAH are also known and produced in batch processes, but such products are limited to low molecular weight products and the batch processes use long reaction times.

Terpolymers containing greater than 2.0 wt % MAH functionality are known, but only achieve greater than 2 wt % MAH functionality by incorporating MAH into the backbone of the polymer. Such MAH-containing polymers do not function well as grafted MAH polymers in certain applications, such as, for example, tie layers.

Maleated PEs with greater than 2.0 wt % MAH functionality can also be produced by dissolving PE in a solvent and grafting in solution, but the products tend to have poor gel and color quality and poor rheology. Also, handling and recovering the solvents adds complexity and hazards to the functionalized polymer preparation process. Similarly, bis-metallocene-based PEs and PE copolymers may be grafted with MAH using peroxide initiated reactive extrusion, but the graft levels are low (below 2.0 wt %). Highly grafted (e.g., greater than or equal to 2.0 wt % grafted functionalization content) ethylene-based polymers with improved properties and methods of manufacturing such highly grafted ethylene-based polymers are needed.

SUMMARY OF THE INVENTION

The invention provides a process to form a functionalized ethylene-based polymer composition, said process comprising reacting an ethylene-based polymer composition in at least one extruder with at least one functionalization agent and at least one free radical initiator at a melt temperature of greater than or equal to 200° C., wherein the functionalized ethylene-based polymer composition has a yellowness index (YI) value of less than or equal to 45, and wherein the functionalized ethylene-based polymer composition has a functionalization content of greater than or equal to 2.0 wt %, based on the weight of the functionalized ethylene-based polymer composition. The invention further provides a functionalized ethylene-based polymer composition comprising a functionalization content of ≥2.0 wt %, based on the total weight of the functionalized ethylene-based polymer composition, and having a yellowness index (YI) value of ≤45.

DETAILED DESCRIPTION

As discussed above, the disclosure provides a process to form a functionalized ethylene-based polymer composition, said process comprising reacting an ethylene-based polymer composition in at least one extruder with at least one functionalizing agent and at least one free radical initiator at a melt temperature of greater than or equal to 200° C., wherein the functionalized ethylene-based polymer composition has a YI (yellowness index) value of less than or equal to 45, a gel level (GI200) of less than 20, and wherein the functionalized ethylene-based polymer composition has a functionalization content of greater than or equal to 2.0 wt %, further greater than or equal to 2.1 wt %, further greater than or equal to 2.2 wt %, based on the weight of the functionalized ethylene-based polymer composition. The melt temperature is the temperature of the melted extrudate, measured after the screw and before the die of the (last) extruder. This temperature is typically measured with a thermocouple (insert thermocouple probe into the polymer melt).

The inventive process may comprise a combination of two or more embodiments as described herein.

Ethylene-Based Polymer

In one embodiment, the ethylene-based polymer comprises, in polymerized form, a majority amount of ethylene monomer and, optionally, at least one comonomer.

In one embodiment, the ethylene-based polymer is an ethylene homopolymer or ethylene-based interpolymer. In a further embodiment, the ethylene-based polymer is an ethylene homopolymer or an ethylene-based copolymer.

In on embodiment, the ethylene-based polymer is an ethylene-based interpolymer. In one embodiment, the ethylene-based interpolymer comprises ≥60 wt %, further ≥70 wt %, further ≥80 wt %, further ≥85 wt %, polymerized ethylene, based on the weight of the interpolymer. In one embodiment, the ethylene-based polymer is an ethylene/alpha-olefin interpolymer, and further an ethylene/alpha-olefin copolymer. Preferred α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, the ethylene-based polymer has a density ≥0.855 g/cc, further ≥0.857 g/cc, further ≥0.860 g/cc (1 cc=1 cm³). In one embodiment, the ethylene-based polymer has a density ≤0.930 g/cc, further ≤0.920 g/cc, and further ≤0.910 g/cc. In one embodiment, the ethylene-based polymer has a density ≤0.900 g/cc, further ≤0.890 g/cc, and further ≤0.880 g/cc. In one embodiment, the ethylene-based polymer has a density from 0.855 g/cm³ to 0.930 g/cm³, or from 0.857 g/cm³ to 0.900 g/cm³, and or from 0.856 g/cm³ to 0.890 g/cm³. In one embodiment, the ethylene-based polymer has a density from 0.855 g/cm³ to 0.920 g/cm³, or from 0.855 g/cm³ to 0.918 g/cm³, and or from 0.855 g/cm³ to 0.916 g/cm³, and or 0.855 g/cm³ to 0.914 g/cm³, or from 0.856 g/cm³ to 0.912 g/cm³.

In one embodiment, the ethylene-based polymer is an ethylene/alpha-olefin copolymer having a density from 0.855 g/cm³ to 0.930 g/cm³, or from 0.857 g/cm³ to 0.900 g/cm³, and or from 0.856 g/cm³ to 0.890 g/cm³. In one embodiment, the ethylene/alpha-olefin copolymer has a density from 0.855 g/cm³ to 0.920 g/cm³, or from 0.855 g/cm³ to 0.918 g/cm³, and or from 0.855 g/cm³ to 0.916 g/cm³, and or 0.855 g/cm³ to 0.914 g/cm³, or from 0.856 g/cm³ to 0.912 g/cm³.

In one embodiment, the ethylene-based polymer has a melt index ($I_2$, 2.16 kg, 190° C.) ≥0.5 dg/min, or ≥1.0 dg/min, or ≥1.5 dg/min, or ≥2 dg/min, or ≥2.5 dg/min, or ≥2.6 dg/min, or ≥2.7 dg/min, or ≥2.8 dg/min.

In one embodiment, the ethylene-based polymer has a melt index ($I_2$, 2.16 kg, 190° C.) ≤10.0 dg/min, or ≤9.0 dg/min, or ≤8.0 dg/min, or ≤7.0 dg/min, or ≤6.0 dg/min, or ≤5.0 dg/min, or ≤4.0 dg/min.

In one embodiment, the ethylene-based polymer is an ethylene/alpha-olefin copolymer. In a further embodiment, the ethylene/alpha-olefin copolymer has a density from 0.855 to 0.930 g/cc, or from 0.855 g/cm³ to 0.920 g/cm³, or from 0.855 g/cm³ to 0.918 g/cm³, and or from 0.855 g/cm³ to 0.916 g/cm³, and or from 0.855 g/cm³ to 0.914 g/cm³, or from 0.856 g/cm³ to 0.912 g/cm³. Examples of alpha-olefins include C3-C8 alpha-olefins.

I one embodiment, the ethylene-based polymer has a residual titanium level of <1.2 ppm, or <1.1 ppm, or <1.0 ppm based on the weight of the ethylene-based polymer.

In one embodiment, the ethylene-based polymer has a residual aluminum level <35 ppm, or <30 ppm, or <25 ppm, or <20 ppm, or <15 ppm, or <10 ppm, or <5 ppm, or <3 ppm, based on the weight of the ethylene-based polymer.

In one embodiment, the ethylene-based polymer has a residual titanium level <1.2 ppm, or <1.1 ppm, or <1.0 ppm, and a residual aluminum level <35 ppm, or <30 ppm, or <25 ppm, or <20 ppm, or <15 ppm, or <10 ppm, or <5 ppm, or <3 ppm, based on the weight of the ethylene-based polymer.

In one embodiment, the ethylene-based polymer has a residual chromium level <0.2 ppm, or <0.19 ppm, or <0.18 ppm, or <0.17 ppm, based on the weight of the ethylene-based polymer.

In one embodiment, the ethylene-based polymer has a residual titanium level <1.2 ppm, or <1.1 ppm, or <1.0 ppm, and a residual chromium level <0.2 ppm, or <0.19 ppm, or <0.18 ppm, or <0.17 ppm, based on the weight of the ethylene-based polymer.

In one embodiment, the ethylene-based polymer has a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, based on the weight of the ethylene-based polymer.

In one embodiment, the ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the ethylene-based polymer.

In one embodiment, the ethylene-based polymer has a residual titanium level <1.2 ppm, a residual aluminum level <35 ppm, and a residual chromium level <0.2 ppm, each based on the weight of the ethylene-based polymer.

In one embodiment, the ethylene-based polymer has a residual chlorine level <7 ppm, or <6 ppm, or <5 ppm, or <4 ppm, or <3 ppm, based on the weight of the ethylene-based polymer.

In one embodiment, the ethylene-based polymer has a residual titanium level <1.2 ppm, or <1.1 ppm, or <1.0 ppm, and a residual chlorine level <7 ppm, or <6 ppm, or <5 ppm, or <4 ppm, or <3 ppm, each based on the weight of the ethylene-based polymer. In one embodiment ethylene-based polymer has a residual titanium level <1.2 ppm, and a residual chlorine level <5 ppm, each based on the weight of the ethylene-based polymer.

In one embodiment, the ethylene-based polymer has a residual aluminum level <35 ppm, or <30 ppm, or <25 ppm, or <20 ppm, or <15 ppm, or <10 ppm, or <5 ppm, or <3 ppm, and a residual chlorine level <7 ppm, or <6 ppm, or <5 ppm, or <4 ppm, or <3 ppm, each based on the weight of the ethylene-based polymer. In one embodiment, the ethylene-based polymer has a residual chromium level <0.2 ppm, or <0.19 ppm, or <0.18 ppm, or <0.17 ppm, and a residual chlorine level <7 ppm, or <6 ppm, or <5 ppm, or <4 ppm, or <3 ppm, each based on the weight of the ethylene-based polymer.

In one embodiment, the ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, and a residual chlorine level <7 ppm, or <6 ppm, or <5 ppm, or <4 ppm, or <3 ppm, each based on the weight of the ethylene-based polymer. In one embodiment, the ethylene-based polymer has a residual calcium level <10 ppm, or <9 ppm, or <8 ppm, or <7 ppm, or <6 ppm, or <5 ppm, based on the weight of the ethylene-based polymer. In one embodiment, the ethylene-based polymer has a residual titanium level <1.2 ppm, or <1.1 ppm, or <1.0 ppm, and a residual calcium level <10 ppm, or <9 ppm, or <8 ppm, or <7 ppm, or <6 ppm, or <5 ppm, each based on the weight of the ethylene-based polymer.

In one embodiment, the ethylene-based polymer has a residual aluminum level <35 ppm, or <30 ppm, or <25 ppm, or <20 ppm, or <15 ppm, or <10 ppm, or <5 ppm, or <3 ppm, and a residual calcium level <10 ppm, or <9 ppm, or <8 ppm, or <7 ppm, or <6 ppm, or <5 ppm, each based on the weight of the ethylene-based polymer. In one embodiment, the ethylene-based polymer has a residual chromium level <0.2 ppm, or <0.19 ppm, or <0.18 ppm, or <0.17 ppm, and a residual calcium level <10 ppm, or <9 ppm, or <8 ppm, or <7 ppm, or <6 ppm, or <5 ppm, each based on the weight of the ethylene-based polymer.

In one embodiment, the ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, a residual chlorine level <7 ppm, or <6 ppm, or <5 ppm, or <4 ppm, or <3 ppm, each based on the weight of the ethylene-based polymer.

In one embodiment, the ethylene-based polymer is free from any oxo-boron compounds. In one embodiment, the ethylene-based polymer composition is free from any borane-containing compounds.

In one embodiment, the ethylene-based polymer is formed from at least one single site catalyst. In a further embodiment, the single site catalyst is selected from a metal complex of a polyvalent aryloxyether, a constrained geometry catalyst, or a bis-metallocene catalyst, and further a metal complex of a polyvalent aryloxyether, or a constrained geometry catalyst.

The ethylene-based polymer may comprise a combination of two or more embodiments as described herein.

In an embodiment, the ethylene-based polymer composition comprises ≥95 wt %, or ≥98 wt %, or ≥99 wt % of the ethylene-based polymer, based on the total weight of the ethylene-based polymer composition.

In an embodiment, the ethylene-based polymer composition comprises at least two ethylene-based polymers. In an embodiment, the ethylene-based polymer composition comprises ≥95 wt %, or ≥98 wt %, or ≥99 wt % of the at least two ethylene-based polymers, based on the total weight of the ethylene-based polymer composition. In one embodiment, the ethylene-based polymer composition comprises only two ethylene-based polymers. In an embodiment, the ethylene-based polymer composition comprises ≥95 wt %, or ≥98 wt %, or ≥99 wt % of the two ethylene-based polymers, based on the total weight of the ethylene-based polymer composition.

In one embodiment, the ethylene-based polymer composition has a melt index ($I_2$, 2.16 kg, 190° C.) ≥0.5 dg/min, or ≥1.5 dg/min, or ≥2 dg/min, or >2.5 dg/min, or ≥2.6 dg/min, or ≥2.7 dg/min, or ≥2.8 dg/min. In one embodiment, the ethylene-based polymer composition has a melt index ($I_2$, 2.16 kg, 190° C.) ≤50 dg/min, or ≤40 dg/min, or ≤30 dg/min, or ≤20 dg/min, or ≤15 dg/min, or ≤10 dg/min, or ≤6.0 dg/min. In one embodiment, the ethylene-based polymer composition has a melt index ratio ($I_{10}/I_2$) of from 6.0 to 12, or from 6.5 to 11, or from 7.0 to 10.

In one embodiment, the ethylene-based polymer composition has a melt index ($I_2$, 2.16 kg, 190° C.) ≤10.0 dg/min, or ≤9.0 dg/min, or ≤8.0 dg/min, or ≤7.0 dg/min, or ≤6.0 dg/min, or ≤5.0 dg/min, or ≤4.0 dg/min.

In one embodiment, the ethylene-based polymer composition has a residual titanium level <1.2 ppm, or <1.1 ppm, or <1.0 ppm based on the weight of the ethylene-based polymer composition. In one embodiment, the ethylene-based polymer composition has a residual aluminum level <35 ppm, or <30 ppm, or <25 ppm, or <20 ppm, or <15 ppm, or <10 ppm, or <5 ppm, or <3 ppm, based on the weight of the ethylene-based polymer composition.

In one embodiment, the ethylene-based polymer composition has a residual titanium level <1.2 ppm, or <1.1 ppm, or <1.0 ppm, and a residual aluminum level <35 ppm, or <30 ppm, or <25 ppm, or <20 ppm, or <15 ppm, or <10 ppm, or <5 ppm, or <3 ppm, each based on the weight of the ethylene-based polymer composition.

In one embodiment, the ethylene-based polymer composition has a residual chromium level <0.20 ppm, or <0.19 ppm, or <0.18 ppm, or <0.17 ppm, based on the weight of the ethylene-based polymer composition. In one embodiment, the ethylene-based polymer composition has a residual titanium level <1.2 ppm, or <1.1 ppm, or <1.0 ppm, and a residual chromium level <0.2 ppm, or <0.19 ppm, or <0.18 ppm, or <0.17 ppm, each based on the weight of the ethylene-based polymer composition. In one embodiment, the ethylene-based polymer composition has a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the ethylene-based polymer composition.

In one embodiment, the ethylene-based polymer composition has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the ethylene-based polymer composition. In one embodiment, the ethylene-based polymer composition has a residual chlorine level <7 ppm, or <6 ppm, or <5 ppm, or <4 ppm, or <3 ppm, based on the weight of the ethylene-based polymer composition.

In one embodiment, the ethylene-based polymer composition has a residual titanium level <1.2 ppm, or <1.1 ppm, or <1.0 ppm, and a residual chlorine level <7 ppm, or <6 ppm, or <5 ppm, or <4 ppm, or <3 ppm, each based on the weight of the ethylene-based polymer composition. In one embodiment, the ethylene-based polymer composition has a residual aluminum level <35 ppm, or <30 ppm, or <25 ppm, or <20 ppm, or <15 ppm, or <10 ppm, or <5 ppm, or <3 ppm, and a residual chlorine level <7 ppm, or <6 ppm, or <5 ppm, or <4 ppm, or <3 ppm, each based on the weight of the ethylene-based polymer composition.

In one embodiment, the ethylene-based polymer composition has a residual chromium level of <0.2 ppm, or <0.19 ppm, or <0.18 ppm, or <0.17 ppm, and a residual chlorine level of <7 ppm, or <6 ppm, or <5 ppm, or <4 ppm, or <3 ppm, based on the weight of the ethylene-based polymer composition.

In one embodiment, the ethylene-based polymer composition has a residual titanium level of <1.2 ppm, or <1.1 ppm, or <1.0 ppm, a residual aluminum level of <35 ppm, or <30 ppm, or <25 ppm, or <20 ppm, or <15 ppm, or <10 ppm, or <5 ppm, or <3 ppm, a residual chromium level of <0.2 ppm, or <0.19 ppm, or <0.18 ppm, or <0.17 ppm, and a residual chlorine level of <7 ppm, or <6 ppm, or <5 ppm, or <4 ppm, or <3 ppm based on the weight of the ethylene-based polymer composition.

In one embodiment, the ethylene-based polymer composition has a residual calcium level of <10 ppm, or <9 ppm, or <8 ppm, or <7 ppm, or <6 ppm, or <5 ppm, based on the weight of the ethylene-based polymer composition. In one embodiment, the ethylene-based polymer composition has a residual titanium level of <1.2 ppm, or <1.1 ppm, or <1.0 ppm, and a residual calcium level of <10 ppm, or <9 ppm, or <8 ppm, or <7 ppm, or <6 ppm, or <5 ppm, each based on the weight of the ethylene-based polymer composition. In one embodiment, the ethylene-based polymer composition has a residual aluminum level of <35 ppm, or <30 ppm, or <25 ppm, or <20 ppm, or <15 ppm, or <10 ppm, or <5 ppm, or <3 ppm, and a residual calcium level of <10 ppm, or <9 ppm, or <8 ppm, or <7 ppm, or <6 ppm, or <5 ppm, each based on the weight of the ethylene-based polymer composition. In one embodiment, the ethylene-based polymer composition has a residual chromium level of <0.2 ppm, or <0.19 ppm, or <0.18 ppm, or <0.17 ppm, and a residual calcium level of <10 ppm, or <9 ppm, or <8 ppm, or <7 ppm, or <6 ppm, or <5 ppm, each based on the weight of the ethylene-based polymer composition.

In one embodiment, the ethylene-based polymer composition has a residual titanium level of <1.2 ppm, or <1.1 ppm, or <1.0 ppm, a residual aluminum level of <35 ppm, or <30 ppm, or <25 ppm, or <20 ppm, or <15 ppm, or <10 ppm, or <5 ppm, or <3 ppm, a residual chromium level of <0.2 ppm, or <0.19 ppm, or <0.18 ppm, or <0.17 ppm, a residual chlorine level of <7 ppm, or <6 ppm, or <5 ppm, or <4 ppm, or <3 ppm, and a residual calcium level of <10 ppm, or <9 ppm, or <8 ppm, or <7 ppm, or <6 ppm, or <5 ppm, each based on the weight of the ethylene-based polymer composition.

In one embodiment, the ethylene-based polymer composition is free from any oxo-boron compounds. In one embodiment, the ethylene-based polymer composition is free from any borane-containing compounds.

In one embodiment, the ethylene-based polymer composition is characterized by a Comonomer Distribution Constant >45, or >50, or >95. In one embodiment, the ethylene-based polymer composition is characterized by a Comonomer Distribution Constant ≤400, or ≤350, or ≤300, or ≤250, or ≤200. In one embodiment, the ethylene-based polymer composition is characterized by a Comonomer Distribution Constant from >45, or >50, or >95 to ≤400, or ≤350, or ≤300, or ≤250, or ≤200, and wherein the ethylene-based polymer composition has <120, or <110, or <100, or <90, or <80, or <70 total unsaturation unit/1,000,000 C. In one embodiment, the ethylene-base polymer composition has <15, or <12, or <10, or <8, or <7, or <6, or <5 trisubstituted unsaturation units/1,000,000 C. In one embodiment, the ethylene-based polymer composition has <20, or <18, or <15, or <12, or <10 vinylidene unsaturation unit/1,000,000 C.

The ethylene-based polymer composition may comprise a combination of two or more embodiments as described herein.

Functionalization

In an embodiment, the inventive process forms a functionalized ethylene-based polymer by reacting an ethylene-based polymer composition in at least one extruder with at least one functionalization agent and at least one free radical initiator.

In an embodiment, the functionalization agent is a compound including at least one functional group. Examples of suitable functional groups include unsaturated carboxylic acids, esters of the unsaturated carboxylic acids, acid anhydrides, di-esters, salts, amides, imides, aromatic vinyl compounds, hydrolysable unsaturated silane compounds and unsaturated halogenated hydrocarbons.

Examples of unsaturated carboxylic acids and acid derivatives include, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2) oct-5-ene-2,3-dicarboxylic acid anhydride, 1,2,3,4,5&g, 1o-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride (XMNA). Examples of the esters of the unsaturated carboxylic acids include methyl acrylate, ethylene acrylate, butyl acrylate, methyl methacrylate, ethyl methacrylate and butyl methacrylate.

Generally, silane compounds useful in the present process have the general formula (I): $CH_2=CR-(COO)_x(C_nH_{2n})_ySiR'_3$. In this formula, R is a hydrogen or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (for example, methoxy, ethoxy, butoxy), aryloxy group (for example, phenoxy), araloxy group (for example, benzyloxy), aliphatic acyloxy group having from 1 to 12 carbon atoms (for example formyloxy, acetyloxy, propanoyloxy), amino or substituted amino groups (alkylamino, arylamino), or a lower alkyl group having 1 to 6 carbon atoms, with the proviso that not more than one of the three R' groups is an alkyl. In another embodiment, not more than two of the three R' groups is an alkyl.

Examples of hydrolysable unsaturated silane compounds include radical polymerizable unsaturated group and an alkoxysilyl group or a silyl group in its molecule, such that the compound has a hydrolysable silyl group bonded to a vinyl group and/or a hydrolysable silyl group bonded to the vinyl group via an alkylene group, and/or a compound having a hydrolysable silyl group bonded to an ester or an amide of acrylic acid, methacrylic acid or the like. Examples thereof include vinyltrichlorosilane, vinlytris(beta-methoxyethoxy)silane, vinyltriethoxysilane, vinyltrimethoxysilane, gamma-methacryloxypropyltrimethoxysilane monovinylsilane and monoallylsilane.

In addition, any silane or mixture of silanes which will graft to the olefin-based polymer may be used, including, for example, unsaturated silanes that comprise both an ethylenically unsaturated hydrocarbyl group, such as a vinyl, allyl, isopropenyl, butenyl, cyclohexenyl or gamma-(meth) acryloxy allyl group, and a hydrolysable group, such as a hydrocarbyloxy, hydrocarbonyloxy, or hydrocarylamino group. Examples of hydrolysable groups include methoxy, ethoxy, formyloxy, acetoxy, proprionyloxy, and alklyl or arylamino groups. Preferred silanes are unsaturated alkoxy silanes which are described fully in U.S. Pat. No. 5,266,627, fully incorporated herein by reference.

Examples of unsaturated halogenated hydrocarbons include vinyl chloride and vinylidene chloride.

Preferred examples of functionalization agents include, but are not limited to, maleic anhydride, acrylic acid, methacrylic acid, maleic acid, fumaric acid, itaconic acid, citraconic acid, mesaconic acid, crotonic acid, methyl acrylate, ethyl acrylate, butyl acrylate, methyl methacrylate, ethyl methacrylate, butyl methacrylate, and silane compounds containing a radical polymerizable unsaturated group and an alkyoxysilyl group or silyl group (e.g., vinyltrichlorosilane, vinyltris(beta-methoxyethoxy)silane, vinyltriethoxysilane, vinyltrimethoxysilane, gamma-methacryloxypropyltrimethoxysilane, monovinylsilane and monoallylsilane). In one embodiment, the functionalization agent comprises maleic anhydride.

In one embodiment, at least one functionalization agent is used (e.g., in the feed) in an amount from 2.0 wt % to 5.0 wt % based on the total weight of the ethylene-based polymer composition, the at least one functionalization agent and the at least one free radical initiator.

In one embodiment, the functionalization agent may comprise a combination of two or more embodiments as described here.

A free-radical initiator, as used herein, refers to a free radical generated by chemical and/or radiation means. There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immegut, E. Grulke, eds. "Polymer Handbook," $4^{th}$ ed., Wiley, N.Y., 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate, t-butyl alpha-cumyl peroxide, di-t-butyl peroxide, di-t-amyl peroxide, t-amyl peroxybenzoate, 1,1-bis(t-butylperoxy)-3,3,5-trim-ethylcyclohexane, alpha,alpha'-bis(t-butylperoxy)-1,3-diisopropyl-benzene, alpha,alpha'-bis(t-butylperoxy)-1,4-diisopropyl-benzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

In one embodiment, the step of reacting an ethylene-based polymer composition with at least one functionalization agent and at least one free radical initiator is conducted at an initiator concentration ≥100 ppm, further ≥250 ppm, and further ≥400 ppm, based on the total weight of the ethylene-based polymer composition, the at least one functionalization agent and the at least one free radical initiator. In one embodiment, the step of reacting an ethylene-based polymer composition with at least one functionalization agent and at least one free radical initiator is conducted at an initiator concentration ≤1,200 ppm, further ≤1,000 ppm, and further ≤800 ppm based on the total weight of the ethylene-based polymer, the at least one functionalization agent, and the at least one free radical initiator. In one embodiment, the initiator step of reacting an ethylene-based polymer composition with at least one functionalization agent and at least one free radical initiator is conducted at an initiator concentration from 100 ppm to 1,200 ppm, further from 250 ppm to 1,000 ppm, and further from 400 ppm to 800 ppm, based on the total weight of the ethylene-based polymer composition, the at least one functionalization agent and the at least one free radical initiator.

In an embodiment, the initiator may comprise a combination of two or more embodiments as described here.

In one embodiment, the extruder is a multiple screw extruder comprising positive and negative conveyance screw elements, and lobed kneading/mixing plates, paddles or blocks. In general, positive conveyance screw elements convey the ethylene-based polymer and/or functionalization agent away from the first zone of the extruder (wherein the ethylene-based polymer, functionalization agent and initiator are initially received and mixed) and towards the latter zones of the extruder (wherein the ethylene-based polymer is devolatilized and discharged from the extruder). Negative conveyance screw elements attempt to force the stream away from the last zone and towards the first zone. In essence, any multiple screw extruder containing screw elements with similar means as those described may be employed. Such screws could conceivably counter-rotate each other. For example, see M. Xanthos, Reactive Extrusion: Principles and Practice, Hanser Publishers, Jan. 1, 1992, Technology & Engineering. In one embodiment, the extruder is a co-rotating twin screw extruder.

In one embodiment, the extruder has an L/D ratio of from 36, or from 44, or from 50 to 65 or 60. In one embodiment, the extruder has an L/D ratio of from 36 to 60, or from 44 to 50. Alternatively, twin extruders in tandem may be used to realize an effective L/D ratio from 80 to 90.

In one embodiment, the extruder operates at a rate of production sufficient to produce greater than or equal to 2,000 lbs. of grafted ethylene-based polymer per hour, or greater than or equal to 2,100 lbs. of grafted ethylene-based polymer per hour, or greater than or equal to 2,200 lbs. of grafted ethylene-based polymer per hour. One skilled in the art may translate the high rate for different size extruders. Without being bound by any particular theory, rates ($Q_1$, $Q_2$) for different diameter ($D_1$, $D_2$) extruders are related by $(Q_1/Q_2)=(D_1/D_2)^n$. The index n is a scale-up factor typically between 2 and 3. In one embodiment, the screw speed is from 400 rpm to 640 rpm. The screw speed is adjusted based on the torque and melt temperature developed.

In an embodiment, the barrel temperatures in the reaction zone of the extruder are between 160° C. and 250° C. At the entrance of the extruder, the temperatures will be kept low (e.g., less than 150° C.) to avoid premature melting. Towards the end of the extruder, the temperatures may be dropped to cool the melt.

In one embodiment, the step of reacting the ethylene-based polymer composition with at least one functionalization agent and at least one free radical initiator take place at a melt temperature of ≥200° C., or ≥210° C., or ≥220° C., or ≥230° C., or ≥240° C., or ≥250° C. In one embodiment, the step of reacting the ethylene-based polymer composition with at least one functionalization agent and at least one free radical initiator take place at a melt temperature of ≥260° C., or ≥280° C., or ≥300° C., or ≥310° C. The melt temperature is the temperature of the melted extrudate, measured after the screw and before the die of the (last) extruder. This temperature is typically measured with a thermocouple (measured by inserting thermocouple probe into the polymer melt to ensure a true melt temperature is recorded).

In one embodiment, the step of reacting the ethylene-based polymer composition with at least one functionalization agent and at least one free radical initiator take place at a melt temperature of ≤400° C., or ≤390° C., or ≤380° C., or ≤370° C., or ≤365° C. In one embodiment, the step of reacting the ethylene-based polymer composition with at least one functionalization agent and at least one free radical initiator take place at a melt temperature of ≤350° C., or ≤340° C., or ≤330° C., or ≤320° C., or ≤310° C., or ≤300° C.

In one embodiment, the step of reacting the ethylene-based polymer composition with at least one functionalization agent and at least one free radical initiator take place at a melt temperature ≥200° C., or ≥210° C., or ≥220° C., or ≥230° C., or ≥240° C., or ≥250° C., or ≥260° C., or ≥280°

C., or ≥300° C., or ≥305° C., or ≥310° C. to ≤400° C., or ≤390° C., or ≤380° C., or ≤370° C., or ≤365° C.

Functionalized Ethylene-Based Polymer

In one embodiment, the process forms a functionalized ethylene-based polymer composition. In one embodiment, the functionalized ethylene-based polymer is a functionalized ethylene-based homopolymer or a functionalized ethylene-based interpolymer, with the ethylene-based polymer, ethylene-based homopolymer, and ethylene-based interpolymer as described above. In an embodiment, the functionalized ethylene-based interpolymer is a functionalized ethylene-based copolymer, with the ethylene-based copolymer as described above.

In one embodiment, the functionalized ethylene-based polymer is an anhydride, carboxylic acid and/or silane functionalized ethylene-based polymer, or further an anhydride functionalized ethylene-based polymer, or further a maleic anhydride functionalized ethylene-based polymer. In one embodiment, the functionalized ethylene-based polymer is an anhydride, carboxylic acid and/or silane functionalized ethylene-based homopolymer or anhydride, carboxylic acid and/or silane functionalized ethylene-based interpolymer. In one embodiment, the functionalized ethylene-based polymer is an anhydride, carboxylic acid and/or silane functionalized ethylene-based interpolymer, or further an anhydride, carboxylic acid and/or silane functionalized ethylene-based copolymer, or further an anhydride, carboxylic acid and/or silane functionalized ethylene/α-olefin copolymer.

In one embodiment, the functionalized ethylene-based polymer is an anhydride and/or acid functionalized ethylene-based homopolymer, or anhydride and/or carboxylic acid functionalized ethylene-based interpolymer. In one embodiment, the functionalized ethylene-based polymer is an anhydride functionalized ethylene-based homopolymer or anhydride functionalized ethylene-based interpolymer. In one embodiment, the functionalized ethylene-based polymer is an anhydride and/or carboxylic acid functionalized ethylene-based interpolymer, or further an anhydride and/or carboxylic acid functionalized ethylene-based copolymer, or further an anhydride and/or carboxylic acid functionalized ethylene/α-olefin copolymer.

In one embodiment, the functionalized ethylene-based polymer is a maleic anhydride, functionalized ethylene-based polymer. In one embodiment, the functionalized ethylene-based polymer is a maleic anhydride functionalized ethylene-based homopolymer or a maleic anhydride functionalized ethylene-based interpolymer. In one embodiment, the functionalized ethylene-based polymer is a maleic anhydride functionalized ethylene-based interpolymer, or further a maleic anhydride functionalized ethylene-based copolymer, or further a maleic anhydride functionalized ethylene/α-olefin copolymer.

In one embodiment, the functionalized ethylene-based polymer is a grafted ethylene-based polymer. In one embodiment, the functionalized ethylene-based polymer is a grafted ethylene homopolymer or grafted ethylene-based interpolymer. In an embodiment, the grafted ethylene-based interpolymer is a grafted ethylene-based copolymer. In one embodiment, the functionalized ethylene-based polymer is an anhydride, carboxylic acid and/or silane grafted ethylene-based polymer, or further an anhydride grafted ethylene-based polymer, or further a maleic anhydride grafted ethylene-based polymer. In one embodiment, the functionalized ethylene-based polymer is an anhydride, carboxylic acid and/or silane grafted ethylene-based homopolymer, or anhydride, carboxylic acid and/or silane grafted ethylene-based interpolymer, or further an anhydride, carboxylic acid and/or silane grafted ethylene-based copolymer.

In one embodiment, the functionalized ethylene-based polymer is an anhydride and/or carboxylic acid grafted ethylene-based homopolymer, or an anhydride and/or carboxylic acid grafted ethylene-based interpolymer, or further an anhydride and/or carboxylic acid grafted ethylene-based copolymer.

In one embodiment, the functionalized ethylene-based polymer is an anhydride, carboxylic acid and/or silane grafted ethylene-based interpolymer, or further an anhydride, carboxylic acid and/or silane grafted ethylene-based copolymer, or further an anhydride, carboxylic acid and/or silane grafted ethylene/α-olefin copolymer.

In one embodiment, the functionalized ethylene-based polymer is an anhydride and/or carboxylic acid grafted ethylene-based homopolymer, or an anhydride and/or carboxylic acid grafted ethylene/α-olefin interpolymer, or further an anhydride and/or acid grafted ethylene/α-olefin copolymer. In one embodiment, the functionalized ethylene-based polymer is an anhydride grafted ethylene-based homopolymer or anhydride grafted ethylene-based interpolymer.

In one embodiment, the functionalized ethylene-based polymer is an anhydride and/or carboxylic acid grafted ethylene-based interpolymer, or further an anhydride and/or carboxylic acid grafted ethylene-based copolymer, or further an anhydride and/or carboxylic acid grafted ethylene/α-olefin copolymer. In one embodiment, the functionalized ethylene-based polymer is an anhydride grafted ethylene-based interpolymer, or further an anhydride grafted ethylene-based copolymer, or further an anhydride grafted ethylene/α-olefin copolymer.

In one embodiment, the functionalized ethylene-based polymer is a maleic anhydride grafted ethylene-based homopolymer or a maleic anhydride grafted ethylene-based interpolymer. In one embodiment, the functionalized ethylene-based polymer is a maleic anhydride grafted ethylene-based interpolymer, or further a maleic anhydride grafted ethylene-based copolymer, or further a maleic anhydride grafted ethylene/α-olefin copolymer.

In one embodiment, the functionalized ethylene-based polymer comprises ≥2.0 weight percent (wt %), or ≥2.1 wt %, or ≥2.2 wt %, or ≥2.5 wt %, or ≥2.8 wt %, or ≥3.0 wt % of the functionalization agent (functionalization content), based on the weight of the functionalized ethylene-based polymer composition. In a further embodiment, the functionalization agent is an anhydride, carboxylic acid and/or silane, further an anhydride, and further maleic anhydride. In one embodiment, the functionalized ethylene-based polymer comprises ≥2.0 wt %, or ≥2.1 wt %, or ≥2.2 wt %, or ≥2.5 wt %, or ≥2.8 wt %, or ≥3.0 wt % of the functionalization agent (functionalization content) based on the weight of the functionalized ethylene-based polymer composition. In a further embodiment, the functionalization agent is an anhydride and/or carboxylic acid, further anhydride, and further maleic anhydride.

In one embodiment, the functionalized ethylene-based polymer has a residual titanium level <1.2 ppm, or <1.1 ppm, or <1.0 ppm based on the weight of the functionalized ethylene-based polymer. In one embodiment, the functionalized ethylene-based polymer has a residual aluminum level <35 ppm, or <30 ppm, or <25 ppm, or <20 ppm, or <15 ppm, or <10 ppm, or <5 ppm, or <3 ppm, based on the weight of the functionalized ethylene-based polymer. In one embodiment, the functionalized ethylene-based polymer has a residual chromium level <0.2 ppm, or <0.19 ppm, or <0.18 ppm, or <0.17 ppm, based on the weight of the functionalized ethylene-based polymer. In one embodiment, the functionalized ethylene-based polymer has a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the functionalized ethylene-based polymer.

In one embodiment, the functionalized ethylene-based polymer has a residual titanium level <1.2 ppm, or <1.1 ppm, or <1.0 ppm and a residual aluminum level <35 ppm, or <30 ppm, or <25 ppm, or <20 ppm, or <15 ppm, or <10 ppm, or <5 ppm, or <3 ppm. In one embodiment, the functionalized ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, and a residual chromium level of <0.2 ppm, or <0.19 ppm, or <0.18 ppm, or <0.17 ppm, each based on the weight of the functionalized ethylene-based polymer. In one embodiment, the functionalized ethylene-based polymer has a residual chlorine level <7 ppm, or <6 ppm, or <5 ppm, or <4 ppm, or <3 ppm, based on the weight of the functionalized ethylene-based polymer.

In one embodiment, the functionalized ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, and a residual chlorine level <7 ppm, or <6 ppm, or <5 ppm, or <4 ppm, or <3 ppm, each based on the weight of the functionalized ethylene-based polymer.

In one embodiment, the functionalized ethylene-based polymer has a residual calcium level <10 ppm, or <9 ppm, or <8 ppm, or <7 ppm, or <6 ppm, or <5 ppm, based on the weight of the functionalized ethylene-based polymer. In one embodiment, the functionalized ethylene-based polymer has a residual titanium level <1.2 ppm, or <1.1 ppm, or <1.0 ppm, and a residual calcium level <10 ppm, or <9 ppm, or <8 ppm, or <7 ppm, or <6 ppm, or <5 ppm, each based on the weight of the functionalized ethylene-based polymer. In one embodiment, the functionalized ethylene-based polymer has a residual aluminum level <35 ppm, or <30 ppm, or <25 ppm, or <20 ppm, or <15 ppm, or <10 ppm, or <5 ppm, or <3 ppm, and a residual calcium level <10 ppm, or <9 ppm, or <8 ppm, or <7 ppm, or <6 ppm, or <5 ppm, each based on the weight of the functionalized ethylene-based polymer. In one embodiment, the functionalized ethylene-based polymer has a residual chromium level <0.2 ppm, or <0.19 ppm, or <0.18 ppm, or <0.17 ppm, and a residual calcium level <10 ppm, or <9 ppm, or <8 ppm, or <7 ppm, or <6 ppm, or <5 ppm, each based on the weight of the functionalized ethylene-based polymer. In one embodiment, the functionalized ethylene-based polymer has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, a residual chlorine level <7 ppm, or <6 ppm, or <5 ppm, or <4 ppm, or <3 ppm, and a residual calcium level <10 ppm, or <9 ppm, or <8 ppm, or <7 ppm, or <6 ppm, or <5 ppm, each based on the weight of the functionalized ethylene-based polymer.

In one embodiment, the functionalized ethylene-based polymer is free from any oxo-boron compounds. In one embodiment, the functionalized ethylene-based polymer is free from any borane-containing compounds.

A functionalized ethylene-based polymer may comprise a combination of two or more embodiments as described herein.

In one embodiment, the functionalized ethylene-based polymer composition comprises ≥95 wt %, or ≥98 wt %, or ≥99 wt % of the functionalized ethylene-based polymer, based on the weight of the functionalized ethylene-based polymer composition.

In an embodiment, the functionalized ethylene-based polymer composition comprises at least two functionalized ethylene-based polymers. In an embodiment, the functionalized ethylene-based polymer composition comprises ≥95 wt %, or ≥98 wt %, or ≥99 wt % of the at least two functionalized ethylene-based polymers, based on the weight of the functionalized ethylene-based polymer composition.

In an embodiment, the functionalized ethylene-based polymer composition comprises only two functionalized ethylene-based polymers. In an embodiment, the functionalized ethylene-based polymer composition comprises ≥95 wt %, or ≥98 wt %, or ≥99 wt % of the two functionalized ethylene-based polymers, based on the weight of the functionalized ethylene-based polymer composition.

In an embodiment, the functionalized ethylene-based polymer composition has a yellowness index (YI) value ≤45, or ≤44, or ≤43, or ≤42, or ≤41, or ≤40, or ≤39, or ≤38, or ≤37, or ≤36, or ≤35.

In an embodiment, the functionalized ethylene-based polymer composition has a gel content, GI200, ≤20, or ≤19, or ≤18, or ≤17, or ≤16, or ≤15, or ≤14, or ≤13, or ≤12, or ≤11, or ≤10, or ≤9, or ≤8, or ≤7, or ≤6, or ≤5. In one embodiment, the functionalized ethylene-based polymer composition has a YI value of less than or equal to 45, or less than or equal to 40, or less than or equal to 38, or less than or equal to 37, or less than or equal to 35 and a gel content (GI200) ≤20, or ≤19, or ≤18, or ≤17, or ≤16, or ≤15, or ≤14, or ≤13, or ≤12, or ≤11, or ≤10, or ≤9, or ≤8, or ≤7, or ≤6, or ≤5.

In an embodiment, the functionalized ethylene-based polymer has a functionalization content of ≥2.0 weight percent (wt %), or ≥2.1 wt %, or ≥2.2 wt %, or ≥2.5 wt %, or ≥2.8 wt %, or ≥3.0 wt %, a YI value of less than or equal to 45, or less than or equal to 40, or less than or equal to 38, or less than or equal to 37, or less than or equal to 35 and a gel content (GI200) ≤20, or ≤19, or ≤18, or ≤17, or ≤16, or ≤15, or ≤14, or ≤13, or ≤12, or ≤11, or ≤10, or ≤9, or ≤8, or ≤7, or ≤6, or ≤5.

In one embodiment, the functionalized ethylene-based polymer composition has a melt index ($I_2$, 2.16 kg, 190° C.) ≥0.5 dg/min, or ≥1.5 dg/min, or ≥2 dg/min, or ≥2.5 dg/min, or ≥2.6 dg/min, or ≥2.7 dg/min, or ≥2.8 dg/min. In one embodiment, the functionalized ethylene-based polymer composition has a melt index ($I_2$, 2.16 kg, 190° C.) ≤50 dg/min, or ≤40 dg/min, or ≤30 dg/min, or ≤20 dg/min, or ≤15 dg/min, or ≤10 dg/min, or ≤6.0 dg/min. In one embodiment, the functionalized ethylene-based polymer composition has a melt index ratio ($I_{10}/I_2$) of from 6.0 to 12, or from 6.5 to 11, or from 7.0 to 10.

In one embodiment, the functionalized ethylene-based polymer composition has a melt index ($I_2$, 2.16 kg, 190° C.) ≤10.0 dg/min, or ≤9.0 dg/min, or ≤8.0 dg/min, or ≤7.0 dg/min, or ≤6.0 dg/min, or ≤5.0 dg/min, or ≤4.0 dg/min.

In one embodiment, the functionalized ethylene-based polymer composition comprises ≥2.0 weight percent (wt %), further ≥2.1 wt %, or further ≥2.2 wt %, or further ≥2.5 wt %, or further ≥2.8 wt %, or further ≥3.0 wt % of the functionalization agent (functionalization content), based on the weight of the functionalized ethylene-based polymer composition. In a further embodiment, the functionalization agent is an anhydride, carboxylic acid and/or silane, further an anhydride, and further maleic anhydride. In a further embodiment, the functionalization agent is an anhydride and/or carboxylic acid, further anhydride, and further maleic anhydride.

In one embodiment, the functionalized ethylene-based polymer composition has a residual titanium level <1.2 ppm, or <1.1 ppm, or <1.0 ppm based on the weight of the functionalized ethylene-based polymer composition. In one embodiment, the functionalized ethylene-based polymer composition has a residual aluminum level <35 ppm, or <30 ppm, or <25 ppm, or <20 ppm, or <15 ppm, or <10 ppm, or <5 ppm, or <3 ppm, based on the weight of the functionalized ethylene-based polymer composition. In one embodiment, the functionalized ethylene-based polymer composition has a residual titanium level <1.2 ppm, or <1.1 ppm, or <1.0 ppm, and a residual aluminum level <35 ppm, or <30 ppm, or <25 ppm, or <20 ppm, or <15 ppm, or <10 ppm, or <5 ppm, or <3 ppm, each based on the weight of the functionalized ethylene-based polymer composition.

In one embodiment, the functionalized ethylene-based polymer composition has a residual chromium level <0.2 ppm, or <0.19 ppm, or <0.18 ppm, or <0.17 ppm, based on the weight of the functionalized ethylene-based polymer composition. In one embodiment, the functionalized ethylene-based polymer composition has a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the functionalized ethylene-based polymer composition.

In one embodiment, the functionalized ethylene-based polymer composition has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, and a residual chromium level <0.2 ppm, or <0.19 ppm, or <0.18 ppm, or <0.17 ppm, each based on the weight of the functionalized ethylene-based polymer composition.

In one embodiment, the functionalized ethylene-based polymer composition has a residual chlorine level <7 ppm, or <6 ppm, or <5 ppm, or <4 ppm, or <3 ppm, based on the weight of the functionalized ethylene-based polymer composition. In one embodiment, the functionalized ethylene-based polymer composition has a residual titanium level <1.2 ppm, or <1.1 ppm, or <1.0 ppm, and a residual chlorine level <7 ppm, or <6 ppm, or <5 ppm, or <4 ppm, or <3 ppm, each based on the weight of the functionalized ethylene-based polymer composition. In one embodiment, the functionalized ethylene-based polymer composition has a residual aluminum level <35 ppm, or <30 ppm, or <25 ppm, or <20 ppm, or <15 ppm, or <10 ppm, or <5 ppm, or <3 ppm, and a residual chlorine level <7 ppm, or <6 ppm, or <5 ppm, or <4 ppm, or <3 ppm, each based on the weight of the functionalized ethylene-based polymer composition.

In one embodiment, the functionalized ethylene-based polymer composition has a residual chromium level <0.2 ppm, or <0.19 ppm, or <0.18 ppm, or <0.17 ppm, and a residual chlorine level <7 ppm, or <6 ppm, or <5 ppm, or <4 ppm, or <3 ppm, each based on the weight of the functionalized ethylene-based polymer composition. In one embodiment, the functionalized ethylene-based polymer composition has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, and a residual chlorine level <7 ppm, or <6 ppm, or <5 ppm, or <4 ppm, or 3 ppm, each based on the weight of the functionalized ethylene-based polymer composition.

In one embodiment, the functionalized ethylene-based polymer composition has a residual calcium level <10 ppm, or <9 ppm, or <8 ppm, or <7 ppm, or <6 ppm, or <5 ppm, based on the weight of the functionalized ethylene-based polymer composition. In one embodiment, the functionalized ethylene-based polymer composition has a residual titanium level <1.2 ppm, or <1.1 ppm, or <1.0 ppm, and a residual calcium level <10 ppm, or <9 ppm, or <8 ppm, or <7 ppm, or <6 ppm, or <5 ppm, each based on the weight of the functionalized ethylene-based polymer composition. In one embodiment, the functionalized ethylene-based polymer composition has a residual aluminum level <35 ppm, or <30 ppm, or <25 ppm, or <20 ppm, or <15 ppm, or <10 ppm, or <5 ppm, or <3 ppm, and a residual calcium level <10 ppm, or <9 ppm, or <8 ppm, or <7 ppm, or <6 ppm, or <5 ppm, each based on the weight of the functionalized ethylene-based polymer composition.

In one embodiment, the functionalized ethylene-based polymer composition has a residual chromium level <0.2 ppm, or <0.19 ppm, or <0.18 ppm, or <0.17 ppm, and a residual calcium level <10 ppm, or <9 ppm, or <8 ppm, or <7 ppm, or <6 ppm, or <5 ppm, each based on the weight of the functionalized ethylene-based polymer composition. In one embodiment, the functionalized ethylene-based polymer composition has a residual titanium level <1.2 ppm, or <1.1 ppm, or <1.0 ppm, a residual aluminum level <35 ppm, or <30 ppm, or <25 ppm, or <20 ppm, or <15 ppm, or <10 ppm, or <5 ppm, or <3 ppm, a residual chromium level <0.2 ppm, or <0.19 ppm, or <0.18 ppm, or <0.17 ppm, a residual chlorine level <7 ppm, or <6 ppm, or <5 ppm, or <4 ppm, or <3 ppm, and a residual chlorine level <7 ppm, or <6 ppm, or <5 ppm, or <4 ppm, or <3 ppm, each based on the weight of the functionalized ethylene-based polymer composition.

In one embodiment, the functionalized ethylene-based polymer composition is free from any oxo-boron compounds. In one embodiment, the functionalized ethylene-based polymer composition is free from any borane-containing compounds.

A functionalized ethylene-based polymer composition may comprise a combination of two or more embodiments as described herein.

Additives and Applications

The functionalized ethylene-based polymer composition may comprise one or more additives. Additives include, but are not limited to, fire retardants, UV stabilizers, plasticizers, colorants, fillers (e.g., inorganic fillers), and slip agents. In one embodiment, the functionalized ethylene-based polymer composition comprises less than 5.0 wt %, further less than 2.0 wt %, further less than 1.0 wt %, further less than 0.5 wt % of the combined weight of one or more additives, based on the total weight of the functionalized ethylene-based polymer composition.

In one embodiment, the functionalized ethylene-based polymer composition comprises at least one flame retardant and/or at least one filler (e.g., inorganic filler).

The functionalized ethylene-based polymer composition may further comprise at least one other polymer, in addition to the functionalized ethylene-based polymer(s). Suitable polymers for blending include natural and synthetic polymers. Suitable polymers include propylene-based polymers (both impact modifying polypropylene, isotactic polypropylene, atactic polypropylene, and random propylene/ethylene copolymers), various types of ethylene-based polymers, including high-pressure, free-radical low density polyethylene (LDPE), heterogeneously branched linear low density polyethylene (LLDPE) (typically via Ziegler-Natta catalysis), homogeneously branched linear or substantially linear PE (typically via single-site catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers, and hydrogenated derivatives thereof (SBS and SEBS), and thermoplastic polyurethanes.

The invention also provides for an impact modified composition comprising an inventive functionalized ethylene-based polymer composition. In a further embodiment, the impact modified composition further includes an olefin-based polymer, and further a propylene-based polymer.

The invention also provides for an article comprising at least one component formed from an inventive functionalized ethylene-based polymer composition.

In one embodiment, the article is selected from a film structure comprising one or more layers, an adhesive primer composition, a dispersion, an automotive part, or a building or construction part.

Definitions

Unless stated to the contrary, all test methods are current as of the filing date of this disclosure.

The term "composition," as used herein, includes a material or mixture of materials which comprise the composition, as well as reaction products and decomposition products formed from the materials of the composition. Typically, any reaction products and/or decomposition products are present in trace amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that typically comprises, in polymerized form, at least a majority amount of an olefin monomer, for example, ethylene or propylene, based on the weight of the polymer, and optionally may comprise one or more comonomers. If the olefin-based polymer is an ethylene-based polymer, see the definition below. In one embodiment, the olefin-based polymer comprises a majority amount of the olefin monomer (based on the weight of the polymer) and optionally may comprise one or more comonomers.

The term "propylene-based polymer," as used herein, refers to a polymer that comprises, in polymerized form, a majority amount of propylene monomer based on the weight of the polymer and, optionally may comprise one or more comonomers.

The term, "ethylene-based polymer," as used herein, refers to a polymer that comprises, in polymerized form, at least 50 wt % or a majority amount of ethylene monomer (based on the weight of the polymer), and optionally may comprise one or more comonomers. In one embodiment, the ethylene-based polymer comprises a majority amount of ethylene monomer (based on the weight of the ethylene-based polymer), and optionally may comprise one or more comonomers.

The term, "ethylene-based interpolymer," as used herein, refers to an interpolymer that comprises, in polymerized form, at least 50 wt % or a majority amount of ethylene monomer (based on the weight of the interpolymer), and at least one comonomer. In one embodiment, the ethylene-based interpolymer comprise a majority amount of ethylene (based on the total weight of the ethylene-based interpolymer) and at least one comonomer.

The term, "ethylene-based copolymer," as used herein, refers to a copolymer that comprises, in polymerized form, at least 50 wt % or a majority amount of ethylene monomer (based on the weight of the copolymer), and a comonomer, as the only two monomer types. In one embodiment, the ethylene-based copolymer comprises a majority amount of ethylene monomer (based on the weight of the ethylene-based copolymer) and a comonomer as the only two monomer types.

The term, "ethylene/α-olefin interpolymer," as used herein, refers to an interpolymer that comprises, in polymerized form, at least 50 wt % or a majority amount of ethylene monomer (based on the weight of the interpolymer), and at least one α-olefin. In one embodiment, the ethylene/α-olefin interpolymer comprises a majority amount of ethylene monomer (based on the weight of the ethylene-based copolymer) and at least one α-olefin.

The term, "ethylene/α-olefin copolymer," as used herein, refers to a copolymer that comprises, in polymerized form, at least 50 wt % or a majority amount of ethylene monomer (based on the weight of the copolymer), and an α-olefin, as the only two monomer types. In one embodiment, the ethylene/α-olefin copolymer comprises a majority amount of ethylene monomer (based on the weight of the ethylene-based copolymer) and an α-olefin as the only monomer types.

The term "ethylene-based polymer composition," as used herein, refers to a composition comprising an ethylene-based polymer. Examples of ethylene-based polymers are described above.

The term, "functionalized ethylene-based polymer," as used herein, refers to an ethylene-based polymer, as defined above, comprising bonded (for example, grafted) functional groups.

The term, "functionalized ethylene-based interpolymer," as used herein, refers to an ethylene-based interpolymer, as defined above, comprising bonded (for example, grafted) functional groups.

The term, "functionalized ethylene-based copolymer," as used herein, refers to an ethylene-based copolymer, as defined above, comprising bonded (for example, grafted) functional groups.

The term, "functionalized ethylene/α-olefin interpolymer," as used herein, refers to an ethylene/α-olefin interpolymer, as defined above, comprising bonded (for example, grafted) functional groups.

The term, "functionalized ethylene/α-olefin copolymer," as used herein, refers to an ethylene/α-olefin copolymer, as defined above, comprising bonded (for example, grafted) functional groups.

The term "functionalized ethylene-based polymer composition," as used herein, refers to a composition comprising a functionalized ethylene-based polymer. Examples of functionalized ethylene-based polymers are described above.

The term "anhydride, carboxylic acid, and/or silane functionalized ethylene-based interpolymer," and similar terms, as used herein, refer to an ethylene-based interpolymer (or copolymer) comprising bonded anhydride groups, bonded carboxylic acid groups and/or bonded silane groups.

The term "anhydride and/or carboxylic acid functionalized ethylene-based interpolymer," and similar terms, as used herein, refer to an ethylene-based interpolymer (or copolymer) comprising bonded anhydride groups and/or bonded carboxylic acid groups.

The term "anhydride functionalized ethylene-based interpolymer," and similar terms, as used herein, refer to an ethylene-based interpolymer (or copolymer) comprising bonded anhydride groups. As understood in the art, trace amounts of anhydride groups may form carboxylic acid groups due to reaction with water, for example, in an atmosphere.

The term "functionalization agent," as used herein, refers to a compound containing at least one functional group which may be bonded into (for example, incorporated) and/or onto (for example, grafted) a polymer.

The term "functional group," as used herein, refers to a chemical group comprising at least one heteroatom (e.g., O, N, Si, Cl). A functional group may additionally contain unsaturation. Exemplary functional groups include, but are not limited to, organic anhydrides, organic amines, organic acids, organic amides, organic esters and organic alcohols.

The term "functionalization content," as used herein, refers to the amount of bonded (for example, grafted) functionalization agent to the ethylene-based polymer of the ethylene-based polymer composition. This amount can be determined based on the weight of the functionalized ethylene-based polymer composition.

The term "free-radical initiator," as used herein, refers to a compound that produces radical species for radical reactions.

The term "borane-containing compound," as used herein, refers to any molecule or compound containing a borane group.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Density is measured in accordance with ASTM D-792.

Melt Index ($I_2$)

Melt index ($I_2$, 190° C.) is measured in accordance with ASTM D-1238.

Yellowness Index (YI)

Yellowness Index (pellet) is measured in accordance with ASTM D-6290 using a 45/0 geometry.

Metals Analysis

Metals Analysis is performed using both Inductively Coupled Plasma-Atomic Emission Spectroscopy (ICP-AES) and X-ray Fluorescence (XRF) techniques. For ICP-AES analysis, the samples are weighted into quartz tubes and 1 mL water and 3 mL nitric acid are added to the samples. The samples are placed in a hot block at 115° C. for 30 minutes. The samples are then placed in an UltraWave Microwave oven where they are digested at 250° C. After digestion in the microwave, the samples are diluted and analyzed by a Perkin Elmer ICP for Al, Ca, Ti and Cr. For XRF, the samples are plagued in a hot press at 260° F. The samples are then cleaned off with distilled water and then with acetone before analysis by XRF. The Cl content is measured by XRF.

Gel Content (GI200)

Gel Content (GI200) is determined using the following procedure:

Extruder: Model OCS ME 20 available from OCS Optical Contro Systems GmbH Wullener Feld 36, 58454 Witten, Germany or equivalent.

| Parameter | Mixing Screw |
|---|---|
| L/D | 25/1 |
| Coating | Chrome |
| Compression Ratio | 3/1 |
| Feed Zone | 10D |
| Transition Zone | 3D |
| Metering Zone | 12D |
| Mixing Zone | 3D |

Cast Film Die: ribbon die, 150×0.5 mm, available from OCS Optical Control Systems GmbH, or equivalent.

Air Knife: OCS air knife to pin the film on the chill roll, available from OCS Optical Control Systems GmbH, or equivalent.

Cast Film Chill Rolls and Winding Unit: OCS Model CR-8, available from OCS Optical Control Systems GmbH, or equivalent.

TABLE 1

Conditions of Gel Measurement on OCS

| | | |
|---|---|---|
| Throat Set Temperature | ° C. | 25 +/− 3 |
| Zone 1 Set Temperature | ° C. | 179 +/− 5 |
| Zone 2 Set Temperature | ° C. | 191 +/− 5 |
| Zone 3 Set Temperature | ° C. | 204 +/− 5 |
| Clamp Ring Set Temperature | ° C. | 216 +/− 5 |
| Adapter Set Temperature | ° C. | 221 +/− 5 |
| Die Set Temperature | ° C. | 221 +/− 5 |
| Screw Type | | Mixing |
| Screw Speed | RPM | 70 +/− 2 |
| Chill Speed | m/min | 3 +/− 1 |
| Chill Temperature | ° C. | 20 +/− 2 |
| Tension Speed | m/min | 4 +/− 2 |
| Winder Torque | N | 4 +/− 1 |
| Lab Temperature | ° C. | 23 +/− 2 |
| Lab Humidity | % | <70 |
| Width | mm | 125 +/− 18 |
| Thickness | μm | 76 +/− 5 |

Gel Counter: OCS FSA-100 line gel counter consisting of a lighting unit, a CCD detector and an image processor with the Gel counter software version 5.0.4.6, available form OCS Optical Control Systems GmbH, or equivalent. One analysis inspects 25 parcels, where a parcel is defined as 24.6 cm$^3$ of film, or 0.324 m$^2$ for a film thickness of 76 µm (microns).

Gel Count: The gel count is the number of gels detected by the gel camera; the counted gels are further classified based on the equivalent circular diameter of the area measured into the following categories: <100 micron, between 100 and 150 microns, between 150 and 200 microns, between 200 and 400 microns, between 400 and 800 microns, between 800 and 1600 microns, and >1600 microns. GI200 is defined as the sum of the areas of all gels with a diameter >200 µm, averaged over 25 parcels (GI200 units mm$^2$ of gels per 24.6 cm$^3$ of film). The diameter of a gel is determined as the diameter of a circle having an equivalent area. One analysis cycle inspects 24.6 cm$^3$ of film. The corresponding area is 0.324 m$^2$ for a film thickness of 76 µm and 0.647 m$^2$ for a film thickness of 38 µm. Alternatively, a gel ppm is measured using the above described technique and GI200 is approximately the gel ppm divided by 3.

Level of Functionalization (wt %)

The level of functionalization (wt %) for maleic anhydride (MAH) is determined by the ratio of peak heights of the MAH (FTIR$_{MAH}$) and the peak heights of the maleic acid (FTIR$_{MA}$) to the peak heights of the polymer reference (FTIR$_{ref}$). The peak heights of MAH are at wave number 1791 cm$^{-1}$, the peak heights of MA are at 1721 cm$^{-1}$ and the peak heights of the polyethylene, which can be used as the polymer reference, are at 2019 cm$^{-1}$. The ratio of peak heights are multiplied by the appropriate calibration constants (A and B), and the products of the ratios and calibration constants are added together to equal the MAH wt %.

When polyethylene is the reference polymer, the MAH wt % is calculated according to the following MAH wt % formula:

$$MAH\ wt\ \% = A\left(\frac{FTIR_{MAH} @ 1791\ cm^{-1}}{FTIR_{ref} @ 2019\ cm^{-1}}\right) + B\left(\frac{FTIR_{MAH} @ 1721\ cm^{-1}}{FTIR_{ref} @ 2019\ cm^{-1}}\right)$$

The calibration A constant can be determined using C$^{13}$ NMR standards, which are known in the field. The actual calibration constant may differ slightly depending on the instrument and the polymers. The peak heights of maleic acid account for the presence of maleic acid in the polyolefins, which is negligible for freshly grafted polyolefins. However, over time, and in the presence of moisture, maleic anhydride is converted to maleic acid. For MAH grafted polyolefins having a high surface area, significant hydrolysis can occur under ambient conditions in just a few days. The calibration constant B is a correction for the difference in extinction coefficients between the anhydride and acid groups, which can be determined by standards known in the field. The MAH wt % formula takes different sample thicknesses into account to normalize the data.

A sample of the MAH grafted polyolefin can be prepared for FTIR analyst in a heating press. The sample of the adhesive layer is about 0.05 mm to about 0.15 mm in thickness and is placed between suitable protective films, such as MYLAR™ or TEFLON™, to protect it from the platens of the heating press. Aluminum foil should not be used as a protective film because MAH reacts with aluminum. The sample is then placed in the heating press at about 150-180° C. and the platens should be under about 10 tons of pressure for about five minutes. The sample remains in the heating press for about one hour and then is allowed to cool to room temperature before being scanned in the FTIR.

A background scan should be run on the FTIR before each sample is scanned, or as needed. The sample is placed in an appropriate FTIR sample holder and then scanned in the FTIR. The FTIR will typically display an electronic graph providing the peak heights of MAH at wave number 1791 cm$_{-1}$, the peak heights of maleic acid at 1721 cm$^{-1}$, and the peak heights of polyethylene at 2019 cm$^{-1}$. The FTIR test should have an inherent variability less than +/−5%.

Experimental

Materials

TABLE 2

Ethylene-Based Polymers

| Ex. | Base Resin* | MI (I$_2$) (dg/min @ 190° C.) | Density (g/cc) | Metal Content (ppm, based on the weight of the composition) | | | | |
|---|---|---|---|---|---|---|---|---|
| | | | | Al | Ca | Cr | Ti | Cl |
| I.E. 1 | LLDPE1 | 3.7 | 0.912 | 1.0 | 2.2 | <0.2 | <0.2 | <5 |
| I.E. 2 | 1EO1 | 5.0 | 0.87 | 3.2 | 1.8 | <0.2 | <0.2 | <5 |
| I.E. 3 | 1EO2 | 1.0 | 0.857 | 22.8 | 7.6 | <0.2 | 0.5 | <5 |
| C.E. A | HDPE | 0.4 | 0.951 | 0.44 | 1.9 | 0.4 | 2.4 | <5 |
| C.E. B | LLDPE2 | 6.0 | 0.919 | 81.9 | 2.9 | <0.2 | 3.1 | 95.4 |
| C.E. C | LLDPE3 | 4.0 | 0.916 | 58.5 | 21.9 | <0.2 | 1.8 | 40.2 |

EO1: single site-catalyzed (for example, see WO 2007/136496) ethylene/octene copolymer.
EO2: single site-catalyzed (for example, see WO 2007/136496) ethylene/octene copolymer.
LLDPE1: single site-catalyzed (for example, see WO 2007/136496) linear low density polyethylene.
HDPE: chrome-catalyzed high density polyethylene.
LLDPE2: Ziegler-Natta catalyzed linear low density polyethylene.
LLDPE3: linear low density polyethylene blend of Ziegler-Natta catalyzed ethylene/octene copolymer and single site-catalyzed (for example, see WO 2007/136496) ethylene/octene copolymer.
I.E.: Inventive Example. C.E.: Comparative Example.
*Each base resin is stabilized with ppm amounts of one or more stabilizers.

Functionalization agent: maleic anhydride (MAH), available from Huntsman

Free-radical initiator (PDX): 2,5-dimethyl-2,5-di(t-butylperoxy) hexane (DBPH, CAS No. 78-63-7), available from Arkema or Akzo Nobel Corp, diluted with a 350 SUS white mineral oil.

The formulations consist of the base polymer, MAH and peroxide diluted with mineral oil (1:1) to enhance the ease of handling and feeding according to the formulations provided in Table 3.

The functionalization reaction is performed in a 92 mm co-rotating twin screw extruder. The extruder is configured with 11 barrels (44 L/D). The extruder is equipped with "loss-in-weight feeders," and the peroxide and MAH are metered into the extruder at barrel 3. A standard extruder temperature profile is used for all experiments where the barrel temperatures 2-8 ranged from 170-225° C. Barrels 9-11 use reduced temperatures to cool the resin for pelletization. Barrel 1 is cooled to prevent premature melting. All grafted polymer compositions are underwater pelletized. An inter atmosphere is injected into the extruder to minimize oxidation. A vacuum (20" Hg) is applied prior to pelletization to remove residuals. The melt temperature (measured at the die exit) for each functionalization reaction is shown in Table 3.

The functionalized ethylene-based polymers are tested for MAH graft content, melt index, pellet yellowness index (YI) and gel level according to the methods described above. The gel ppm is measured and the GI200=gel ppm/3. A "1:1 (by weight) dry blend with AFFINITY 8100 (1 MI, 0.87 g/cc)" is used to enable even feeding into the extruder. All GI200 results reported are as $mm^2$ of gels per 24.6 $cm^3$ of film.

TABLE 3

Functionalization Conditions

| | Formulations | | | Extrusion Process Conditions | | | |
|---|---|---|---|---|---|---|---|
| | Base Resin (of the ethylene-based polymer composition) | MAH (feed, wt %)* | POX (ppm)** | Rate (lb./h) | Screw (rpm) | Melt Temp (° C.) | Torque (%) |
| I.E. 1 | LLDPE1 | 2.65 | 600 | 2000 | 600 | 363 | 69 |
| I.E. 2 | EO1 | 2.8 | 733 | 2100 | 525 | 312 | 75 |
| I.E. 3 | EO2 | 2.8 | 733 | 2000 | 450 | 315 | 90 |
| C.E. A | HDPE | 2.45 | 400 | 1800 | 625 | — | 70 |
| C.E. B | LLDPE2 | 2.65 | 600 | 2000 | 600 | 359 | 69 |
| C.E. C | LLDPE3 | 2.65 | 600 | 2000 | 600 | 361 | 66 |

POX = active peroxide (not oil + peroxide).
*Amount of MAH (wt %) based on the sum weight of the base resin, MAH and POX.
**Amount of POX (ppm) based on the sum weight of the base resin, MAH and POX

TABLE 4

Functionalized Polymer Composition Properties

| | | Grafted Material Properties | | | |
|---|---|---|---|---|---|
| | | MI (190° C./ 2.16 kg) | Graft MAH (wt %)* | YI | GI200*** |
| I.E. 1 | g-LLDPE1** | 2.3 | 2.45 | 37 | 2.3 |
| I.E. 2 | g-EO1 | 1.8 | 2.37 | 35 | 9.7 |
| I.E. 3 | g-EO2 | 1.0 | 2.57 | 40 | 7.0 |
| C.E. A | g-HDPE | 1.6 | 2.23 | 57 | 103.0 |
| C.E. B | g-LLDPE2 | 1.1 | 2.49 | 43 | 19.0 |
| C.E. C | g-LLDPE3 | 1.4 | 2.28 | 57 | 10.0 |

*Amount of MAH bound (grafted) based on the weight of the functionalized polymer composition.
**g-LLDPE1: MAH grafted LLDPE1.
***GI200 results reported are as $mm^2$ of gels per 24.6 $cm^3$ of film.

Although each of the base resins of I.E. 1, I.E. 2, I.E. 3 and C.E. A, C.E. B and C.E. C is grafted to above 2 wt % MAH (based on the weight of the functionalized polymer composition), the functionalized polymers formed from the three ethylene-based polymers of I.E. 1, I.E. 2 and I.E. 3 showed a yellowness index of less than 45 and a GI200 less than 15. The YI and GI200 are higher for the Ziegler-Natta-catalyzed HDPE despite the use of a lower level of MAH and a lower level of PDX. For the three LLDPE's (I.E. 1, C.E. B, C.E. C) only LLDPE 1 shows both a low YI and low GI200.

Previous studies have shown that to achieve high grafting levels (for example, greater than or equal to 2 wt %), the end functionalized polymer is characterized by high YI values and/or high gel content.

It has been discovered that the inventive process can be used to form functionalized polymer compositions that contain high levels of bound (e.g., grafted) functionalization agent, low color, and low gel levels. As shown above, the inventive examples have higher functionalization levels, lower YI values and lower GI200 levels, as compared to the comparative example. It has been discovered that suitable base polymers with lower residual metal content provide for high grafting levels (e.g., greater than or equal to 2 wt %) and reduced color and low gels.

The invention claimed is:

1. A process to form a functionalized ethylene-based polymer composition, said process comprising reacting an ethylene-based polymer composition having less than 1.2 ppm residual titanium metal in at least one extruder with at least one functionalization agent and at least one free radical initiator at a melt temperature of greater than, or equal to 250° C.; and
wherein the functionalized ethylene-based polymer composition has a yellowness index value of less than, or equal to, 45, and a gel content (GI200) of less than or equal to 20; and
wherein the functionalized ethylene-based polymer composition has a functionalization content of greater than 2.2 wt %, based on the weight of the functionalized ethylene-based polymer composition.

2. The process of claim 1, wherein the melt temperature is greater than, or equal to, 300° C.

3. The process of claim 1, wherein the ethylene-based polymer composition has a residual titanium level of less than 1.2 ppm and a residual aluminum level of less than 35 ppm, based on the weight of the ethylene-based polymer composition.

4. The process of claim 1, wherein the functionalized ethylene-based polymer is an maleic anhydride, functionalized ethylene-based polymer.

5. The process of claim 1, wherein the ethylene-based polymer composition comprises greater than or equal to 95 wt % of an ethylene-based polymer, based on the total weight of the ethylene-based polymer composition.

6. The process of claim 1, wherein the ethylene-based polymer is an ethylene/alpha-olefin copolymer, and wherein the ethylene/alpha-olefin copolymer has a density from 0.855 to 0.930 g/cc.

7. A functionalized ethylene-based polymer composition comprising a functionalization content of greater than 2.2 wt %, based on the total weight of the functionalized ethylene-based polymer composition, a yellowness index value of less than or equal to 45, a gel content (GI200) of less than or equal to 20; and less than 1.2 ppm residual titanium metal.

8. An article comprising at least one component formed from the functionalized ethylene-based polymer composition of claim 7.

* * * * *